United States Patent [19]

Adee et al.

[11] Patent Number: 4,790,389
[45] Date of Patent: Dec. 13, 1988

[54] FIELD CULTIVATOR FRAME WITH LIMITING ASSEMBLY

[75] Inventors: Raymond A. Adee, Newton; James A. Boone; Dennis L. Lewallen, both of Quinter, all of Kans.

[73] Assignee: Flex-King Corporation, Quinter, Kans.

[21] Appl. No.: 854,533

[22] Filed: Apr. 22, 1986

[51] Int. Cl.$^4$ ............................................. A01B 73/04
[52] U.S. Cl. ..................................... 172/776; 172/311; 280/411 A; 403/113
[58] Field of Search ............... 172/310, 311, 456, 662, 172/776; 280/411 R, 411 A, 656; 403/113, 114, 115, 116, 117

[56] References Cited

U.S. PATENT DOCUMENTS

| | | | |
|---|---|---|---|
| 3,003,296 | 5/1962 | Kauffman et al. | 172/311 X |
| 3,135,337 | 6/1964 | Morris | 172/311 X |
| 3,337,242 | 8/1967 | Richardson | 172/311 X |
| 3,414,064 | 12/1968 | Foster | 172/311 |
| 3,841,412 | 10/1974 | Sosalla | 172/311 |
| 3,987,832 | 8/1975 | Leedhal et al. | 172/311 |
| 4,044,842 | 8/1977 | Worick | 172/314 |
| 4,050,522 | 9/1977 | Ralston et al. | 172/311 |
| 4,058,170 | 11/1977 | Ankenman et al. | 172/456 X |
| 4,105,077 | 8/1978 | Seifert, Jr. | 172/311 |
| 4,178,009 | 12/1979 | Worick | 172/311 |
| 4,191,260 | 3/1980 | Klindworth | 172/311 |
| 4,204,575 | 5/1980 | Richardson et al. | 172/311 X |
| 4,244,428 | 1/1981 | Sloan | 172/456 X |
| 4,300,640 | 11/1981 | Baxter et al. | 172/311 |
| 4,341,269 | 7/1982 | Hann | 172/311 |
| 4,535,848 | 8/1985 | Pfenninger et al. | 172/311 |
| 4,619,330 | 10/1986 | Machnee | 172/456 X |
| 4,676,321 | 6/1987 | Friggstad | 172/311 X |

OTHER PUBLICATIONS

Printed Publication-Krause-Field Cultivators by Krause Plow Corp. Hutchinson, KS 67504, Series 4100 & 4200-Date unknown.
Printed Publication-Calkins 4+4 Field Cultivator by Calkins Mfg. Co., Spokane, WA 99214-date unknown.

Primary Examiner—Richard T. Stouffer
Attorney, Agent, or Firm—Litman, McMahon & Brown

[57] ABSTRACT

A field cultivator frame has a number of generally horizontal implement frame sections, each frame section having ground engaging wheels for movable support over the ground. First and second center frame sections are pivotally connected to a prime mover by a hinged draw bar assembly. Front ends of the center frame sections are pivotally connected by a flex link assembly including a connecting bar with ball joint connections at either end. The flex link assembly allows vertical movement of the center frame sections relative to one another, which movement is limited by a plate assembly attached to one of the center frame sections. A swivel joint assembly connects rear parts of the first and second center frame sections for allowing hinged movement of the frame sections relative to one another. A spring-loaded limit assembly connects the first and second center frame sections and includes compression springs for resilient limiting of relative movement of the center frame sections. First and second outer wing sections are hingedly connected to the first and second center frame sections, respectively. Rearward ground engaging wheels associated with the center frame section are located in line with the hinge connections, obviating the need for wheel pockets in the interior frame.

15 Claims, 3 Drawing Sheets

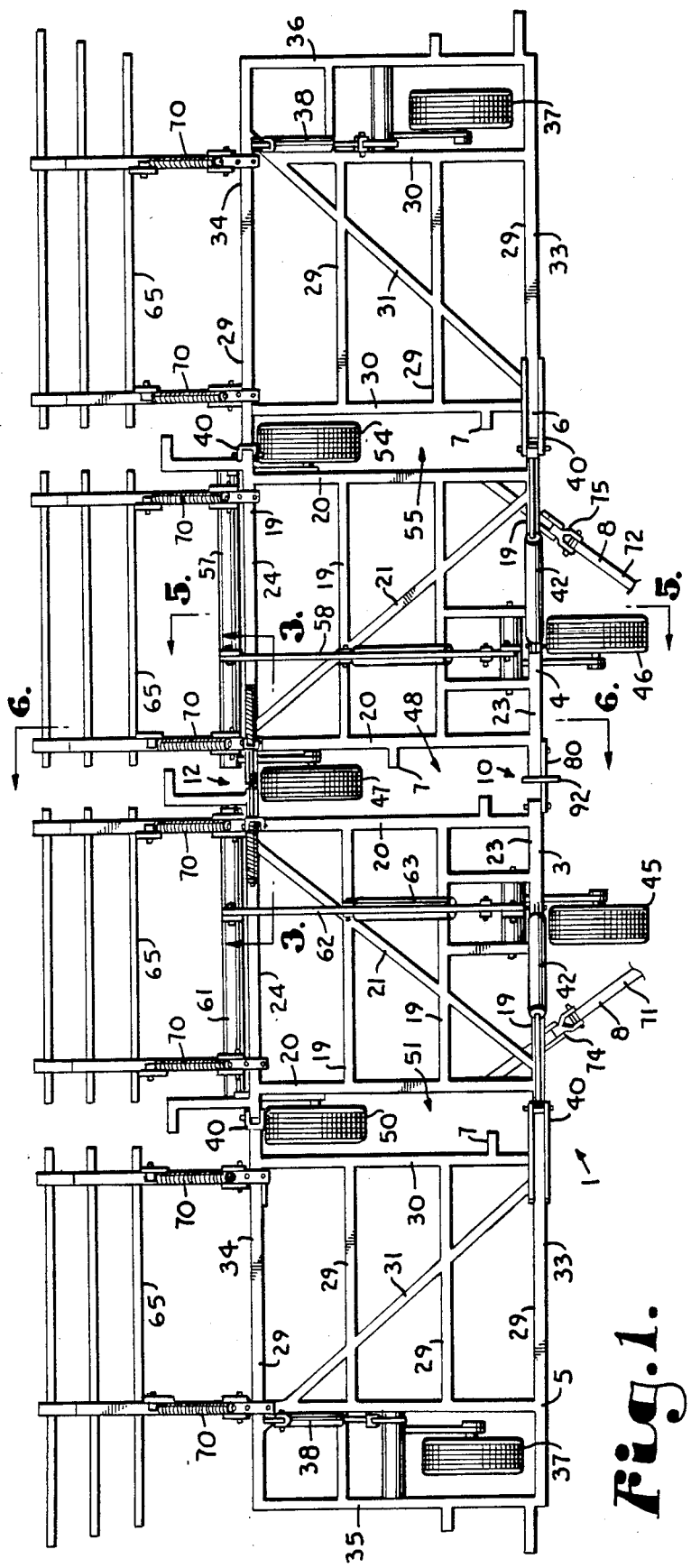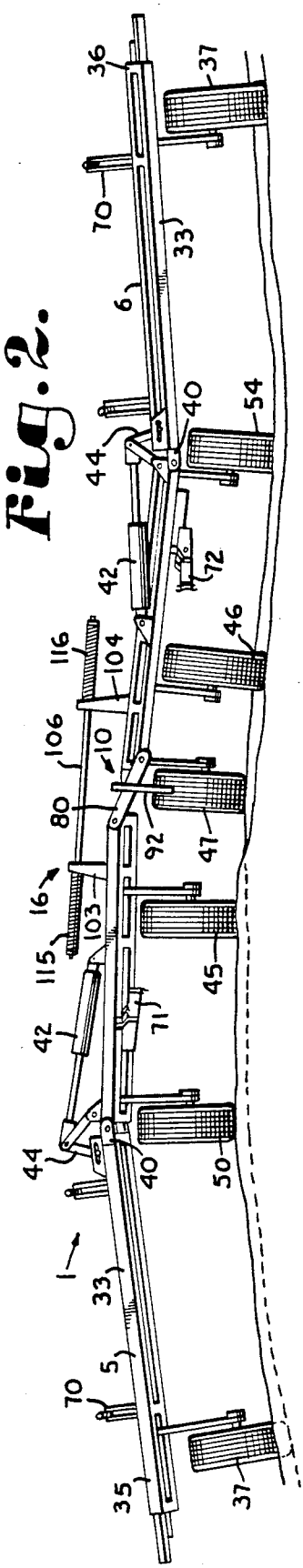

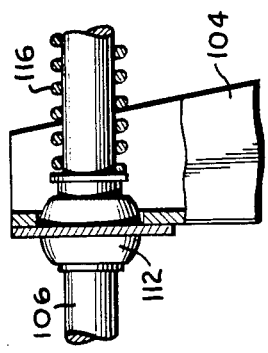
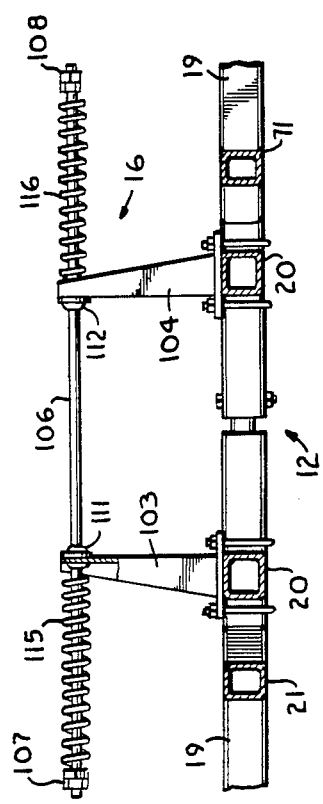
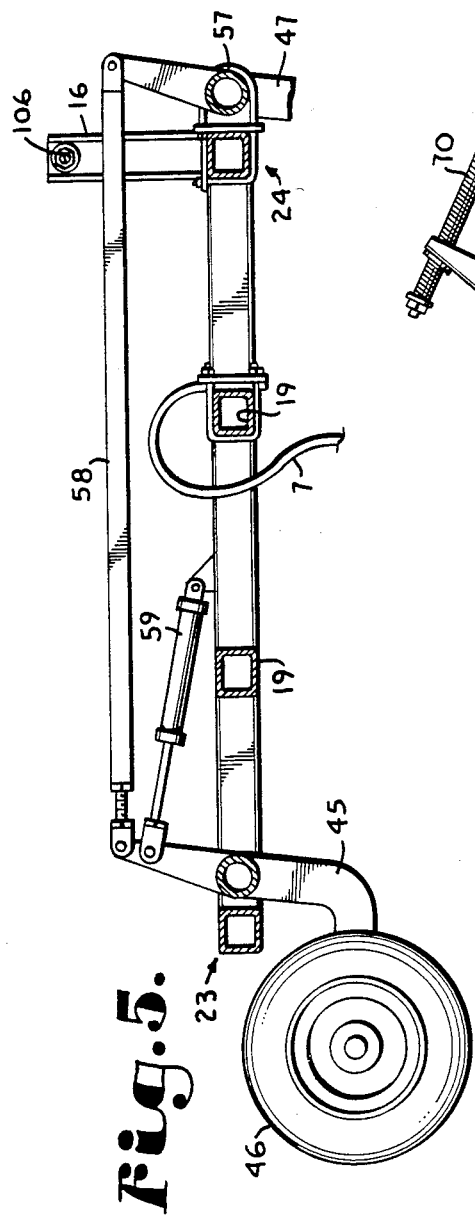
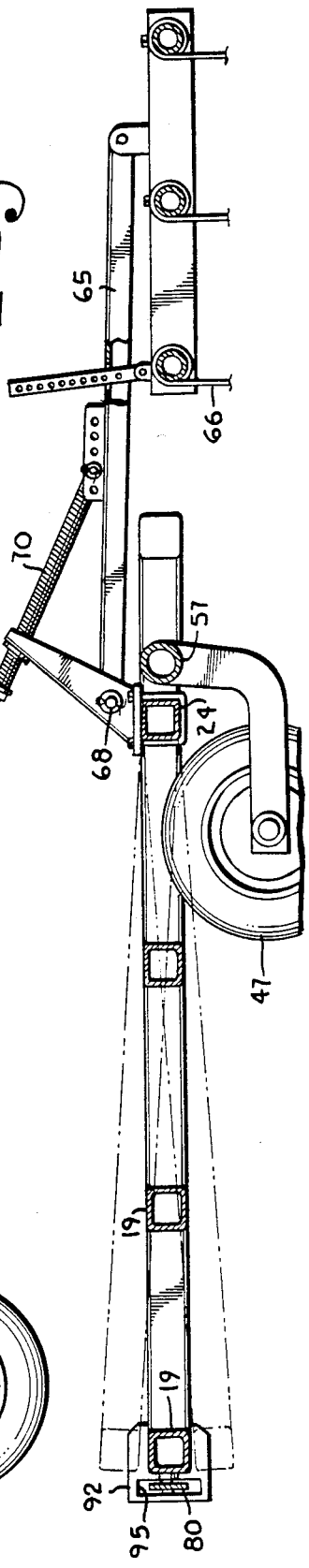

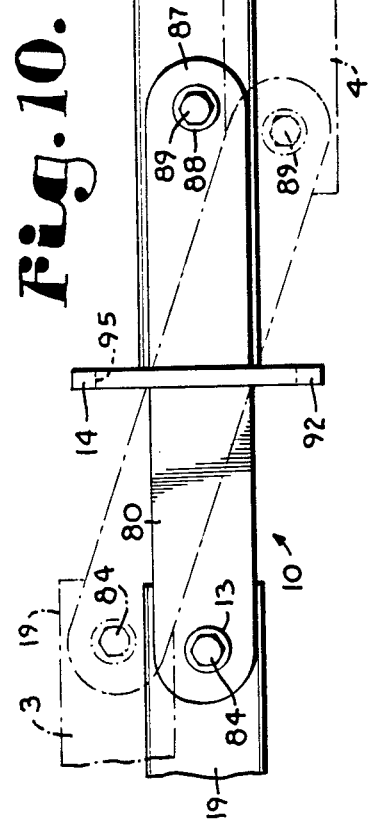
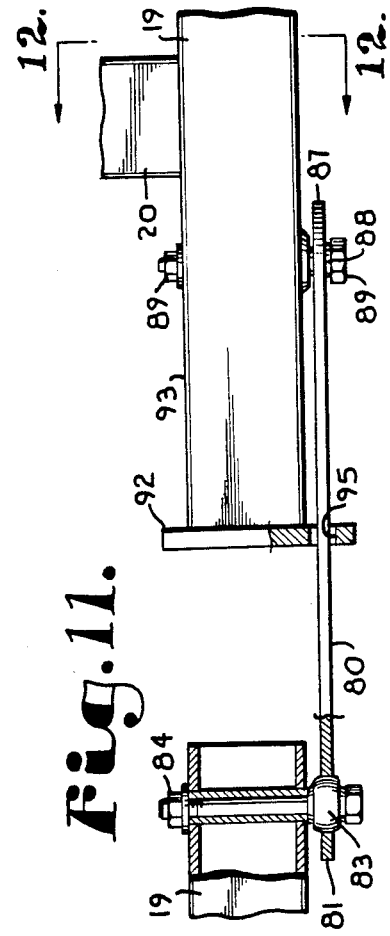
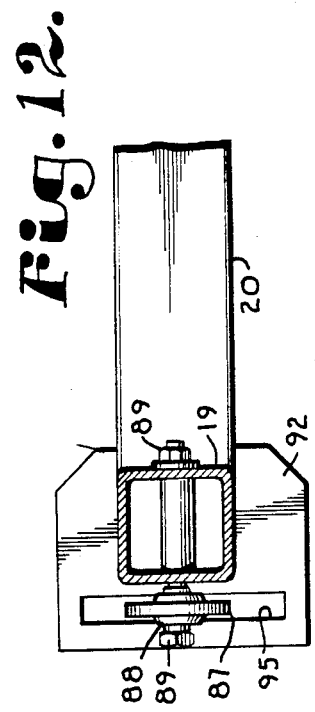
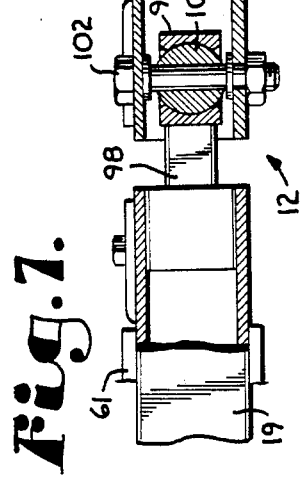
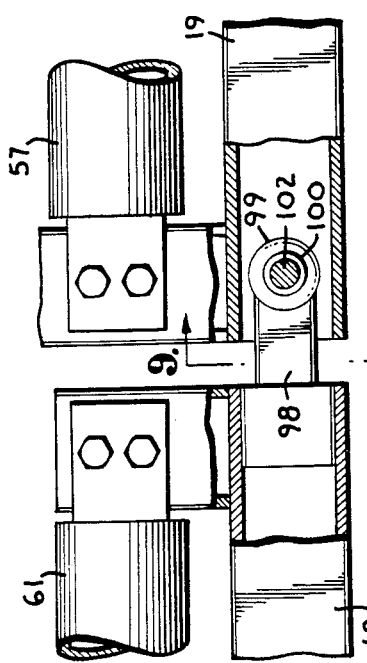
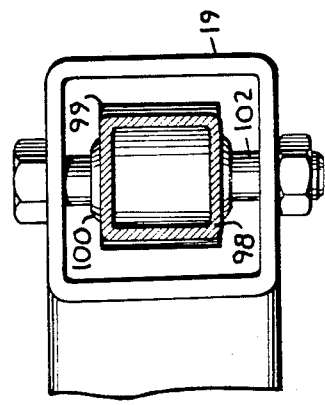

FIELD CULTIVATOR FRAME WITH LIMITING ASSEMBLY

BACKGROUND OF THE INVENTION

This invention relates to agricultural implements and more particularly to such implements having multiple articulate sections.

Multiple-section field cultivator frames are used to provide relatively wide implement frames that can be transported over existing roads. Typically, outer wing sections of such implement frames are hingedly connected to a center frame section, and hydraulic cylinder arrangements are provided to fold the outer wing sections up for transport. One advantage of folding is that, typically, the hinge connection allows the multiple section frame to conform to undulating terrain.

In the past, good depth control, especially during cultivating operations, was difficult due to changes in the terrain which, if the implement was set at too shallow a depth, could result in sections not being cultivated. On the other hand, when the ground working elements are set deep enough to alleviate this problem, the resulting depth may be so deep as to cause a loss of ground moisture. Thus, attempts have been made to provide hinged frame sections that conform more evenly to changing terrain in an attempt to achieve better depth control.

The strength of such multiple section frames has also been a problem in that large tubing and reinforcing structures have sometimes been required, due to poor structural design of the individual frame sections. One design flaw has been the need to modify the frames to accommodate the ground engaging wheels, and special wheel pockets. These wheel pockets tend to be in line with certain of the ground working elements, which tends to add to the problem of collection of so-called trash by the ground working elements.

OBJECTS OF THE INVENTION

The principal objects of the present invention are: to provide a field cultivator frame which oscillates to fit undulating terrain; to provide such a frame which has at least two generally horizontally disposed center frame sections; to provide such a frame which has a flex link assembly for connecting the center frame sections; to provide such a flex link assembly which includes a connecting bar with ball joint connections at either end for connection to the center frame section; to provide such a frame which has a swivel joint assembly connecting rear parts of the center frame sections for allowing hinged movement thereof; to provide such a frame having means for limiting the amount of oscillation between the two center frame sections; to provide such a frame having outer wing sections hingedly connected to the center frame sections; to provide such a frame having ground engaging wheels located along hinge lines between the center frame sections and the outer wing sections.

Other objects and advantages of this invention will become apparent from the following description taken in conjunction with the accompanying drawings wherein are set forth, by way of illustration and example, certain embodiments of this invention.

SUMMARY OF THE INVENTION

An implement frame has a number of generally horizontal frame sections, each frame section having ground engaging wheels for movable support over the ground. First and second center frame sections are pivotally connected to a prime mover by a hinged draw bar assembly. First and second outer wing sections are hingedly connected to the first and second center frame sections, respectively.

Front ends of the center frame sections are pivotally connected by a flex link assembly including a connecting bar having ball joint connections at either end to the first and second center frame sections, respectively. The flex link allows vertical movement of the center frame sections relative to one another. The vertical movement is limited by a stop plate assembly attached to one of the first and second frame sections. The limit plate assembly has a slot therein through which the connecting rod extends and whereby movement is limited.

A swivel joint assembly connects rear parts of the first and second center frame sections for allowing movement of the rear ends of the frame sections relative to one another. A spring-loaded limit assembly located near the swivel joint connects the first and second center frame sections and includes compression springs for resilient limiting of relative movement of the center frame sections. The flex link assembly and the swivel joint assembly provide good depth control during tillage. Control is maintained over hills or terraces and in the swales of terraces, particularly when working at low tillage depths to kill small weeds. The unit does not lose contact with the ground, so the depth does not have to be unduly increased to prevent such an occurrence. Thus, ground moisture is not lost, since the low cutting depth can be maintained.

Rearward ground engaging wheels associated with the center frame section are located in line with the hinge connections, obviating the need for wheel pockets in the interior frame. Forward wheels are placed in front of the center frame sections away from the ground working elements. Outer wing wheels are placed slightly forward of a transverse center line of the frame to reduce or eliminate frame torquing and machine bouncing. This wheel placement permits a uniform, consistent ground working element pattern, which improves trash flow around the frame. The ground working elements can thus be placed in four uninterrupted rows instead of the usual three that are broken up with tandem wheels in wheel pockets formed into center frame sections.

The frame structure is simple and strong due to the wheel location at hinge lines. Also, each frame section is generally rectangularly shaped with a diagonal reinforcing member forming two contiguous triangles for increased strength in the horizontal plane. This is accomplished by the present invention while maintaining an optimum ground working element pattern without frame cutouts or wheel pockets in the center frame sections. The triangular arrangement reduces hitch requirements to two simple hinged tension members, as opposed to the more common rigid torque implements with additional lateral members and hinges.

The drawings constitute a part of this specification and include exemplary embodiments of the present invention and illustrate various objects and features thereof.

BRIEF DESCRIPTION OF THE DRAWINGS

FIG. 1 is a fragmentary top plan view of a field cultivator frame according to the present invention.

FIG. 2 is a fragmentary front elevational view of the frame illustrating oscillating movement thereof.

FIG. 3 is an enlarged, fragmentary cross-sectional view taken along line 3—3, FIG. 1.

FIG. 4 is an enlarged, fragmentary view of a spring-loaded limit assembly shown in FIG. 3.

FIG. 5 is an enlarged, fragmentary sectional view taken along line 5—5, FIG. 1.

FIG. 6 is an enlarged, fragmentary sectional view taken along line 6—6, FIG. 1, with oscillation of the frame shown in phantom.

FIG. 7 is an enlarged, fragmentary front elevational view of a swivel joint assembly of the present invention with portions broken away to show interior detail.

FIG. 8 is an enlarged, fragmentary top plan view of the swivel joint assembly with portions broken away to show interior detail.

FIG. 9 is an enlarged, fragmentary sectional view taken along line 9—9, FIG. 8.

FIG. 10 is an enlarged, fragmentary front elevational view of the flex link assembly of the present invention, with oscillation thereof indicated in phantom lines.

FIG. 11 is an enlarged, fragmentary top plan view of the flex link assembly, with portions broken away to show interior detail.

FIG. 12 is a fragmentary sectional view taken along line 12—12, FIG. 11.

DETAILED DESCRIPTION OF THE INVENTION

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring in more detail to the drawings, reference numeral 1 generally indicates a field cultivator frame according to the present invention. The frame 1 is illustrated as having four generally horizontally disposed frame sections, namely, first and second center sections 3 and 4, and first and second wing sections 5 and 6. The various center and wing frame sections 3, 4, 5, and 6 (sometimes referred to as center sections and wing sections) are generally disposed on respective first and second sides of a central longitudinal axis extending longitudinally of a direction of travel of the frame 1. The frame sections 3, 4, 5, and 6 carry a plurality of ground working elements 7, which elements 7 depend from the frame sections in a uniform placement pattern.

The first wing section 5 is pivotally connected to the first center section 3, which in turn is pivotally connected to the second center sections 4, which lastly is pivotally connected to the second wing section 6. Ground engaging wheels are provided for movable support over the ground. The first and second center sections 3 and 4 are hingedly connected to a prime mover (not shown) by coupling means such as a draw bar assembly 8. A flex link assembly 10 and swivel joint assembly 12 are provided to connect the first and second center sections 3 and 4 together. Means are provided to limit vertical displacement of the first and second center sections 3 and 4 relative to one another. Oscillation of the first and second center sections 3 and 4 relative to each other is limited by a stop plate assembly 14. A spring-loaded limit assembly 16 is also provided to limit the angular displacement of the first and second center sections 3 and 4.

The first and second center sections 3 and 4 are substantially mirror images of one another, as evident from FIG. 1. The center sections 3 and 4 include four rows of cross members 19 connected by a pair of longitudinal members 20. Reinforcing members 21 run diagonally from a forward end 23 of the center sections toward the central axis and to a rearward end 24 of the center sections 3 and 4. Thus, as seen in FIG. 1, a strong triangular arrangement of the first and second center sections 3 and 4 is achieved. The ground working elements 7 depend from the various cross members 19, such as seen in FIG. 5. The ground working elements 7 depend from the four cross members 19 in a laterally staggered pattern whereby the width of the center sections 3 and 4 is substantially cultivated by the ground working elements 7. However, the ground working elements 7 are not shown in all of the figures, for purposes of clarity in the drawings.

The first and second wing sections 5 and 6 are connected to the first and second center sections 3 and 4, respectively. The wing sections 5 and 6 each comprise four cross members 29 connected by two longitudinal members 30, in a manner substantially similar to that of the center sections 3 and 4. Reinforcing members 31 extend from a forward end 33 of the wing sections to a rearward end 34 of the center sections 5 and 6, but as opposed to the center reinforcing members 21, the wing reinforcing members 31 generally extend away from the central axis. Thus, as can be seen in FIG. 1, the first and second wing sections 5 and 6 also exhibit triangular arrangements for strength. The ground working elements 7 depend from the four cross members 29 in a laterally staggered pattern whereby the width of the wing frame sections 5 and 6 is substantially cultivated by the ground working elements 7.

Outer ends of the wing sections 5 and 6 are attached to outer wheel supports 35 and 36, respectively. Outer wheel assemblies 37 depend from the wheel supports 35 and 36 and are actuated by respective hydraulic cylinder assemblies 38. The outer wheels 37 and hydraulic cylinders 38 are actuated in unison with other such devices, as explained below. The outer wheel assemblies 37 are placed generally forward of a transverse center line of the frame sections, thereby reducing torquing problems caused by draw bar pull.

The wing sections 5 and 6 are connected to their respective center sections 3 and 4, by conventional hinges 40, which permit the wing sections to be folded about a longitudinal hinge line or axis through the hinges 40 toward the central axis for transport. Power pivot means such as hydraulic cylinder assemblies 42 are used to power rotate the wing sections 5 and 6. Lost motion connections 44 on the wing sections 5 and 6 are utilized to permit relative movement or "floatation" of the wing sections 5 and 6 during tillage.

Laterally spaced first and second front, or forward, wheel assemblies 45 and 46 are pivotally connected to the first and second center frame sections 3 and 4, near forward ends 23 thereof. The forward wheel assemblies 45 and 46 extend in front of the center sections 3 and 4 so as not to interfere with the spacing of the ground working elements 7. A central wheel assembly 47 is pivotally connected to the second center frame section 4, and is received in a central hinge pocket 48 defined between the first and second center frame sections 3 and 4 along the central axis. Thus, the center wheel assembly 47 is shared by the center frame sections 3 and 4 and does not interfere with the spacing of the ground working elements 7. In order to adequately till the ground, ground working elements 7 are located in the hinge pocket 48, but forward of the center wheel assembly 47.

A first wing wheel assembly 50 is pivotally connected to the first center section 3. A first wing hinge pocket 51 is defined between the first wing section 5 and the first center section 3, along the first wing longitudinal hinge line. At least one ground working element 7 is carried in the first wing hinge pocket 51.

A second wing wheel assembly 54 is received in a second wing hinge pocket 55 and is pivotally connected to the second center section 4. The second wing wheel assembly 54 is centered along the second wing longitudinal hinge line. A ground working element 7 is received in the second wing hinge pocket 55 for proper tilling.

As illustrated in FIG. 1, the first and second front wheel assemblies 45 and 46, the center wheel assembly 47, and the first and second wing wheel assemblies 50 and 54 exhibit a shared wheel double tricycle suspension arrangement.

Means are provided to actuate the outer wheels 37, forward wheel assemblies 45 and 46, center wheel assembly 47, and first and second wing wheel assemblies 50 and 54 simultaneously to set a desired working depth of the ground working elements 7 carried by the frame 1. To accomplish this, the center wheel assembly 47 and second wing wheel assembly 54 are connected to a second pivot tube 57 carried by the second center section 4. A second connector rod 58 extends between the pivot tube 57 and the second forward wheel assembly 46 as seen in FIG. 5. A pivot means, such as a master hydraulic cylinder 59, is pivotally connected to the second center section 4 and to the second forward wheel assembly 46. As is evident from FIG. 5, actuation of the master hydraulic cylinder 59 will simultaneously result in movement of the second forward wheel assembly 46, the center wheel assembly 47, and the second wing wheel assembly 54.

The first wing wheel assembly 50 is connected to a first pivot tube 61, which is rotatably held by the first center section 3. A first connector rod 62 connects the first pivot tube 61 to the first forward wheel assembly 45 in a manner like the second connector rod 58. A pivot means, such as slave hydraulic cylinder 63, is connected to the first center section 3 and the first forward wheel assembly 45 for simultaneous raising and lowering of the first wing wheel assembly 50 and the first forward wheel assembly 45.

The slave hydraulic cylinder 63, as well as the outer hydraulic cylinders 38, are slaves to the master hydraulic cylinder 59, in that they react in unison therewith through appropriate hydraulic fluid line linkage systems. Thus, actuation of the master hydraulic cylinder 59 results in simultaneous raising or lowering of all of the various wheel assemblies.

Auxiliary ground working frames 65 are pivotally connected to the various center and wing sections 3, 4, 5, and 6 for providing auxiliary ground working elements 66, such as a spring-loaded tine assembly. As seen in FIG. 6, the auxiliary ground working frames 65 are connected to the various frame sections at pivot 68. A rod and spring unit 70 also extends between the auxiliary ground working frame 65 and the associated center or wing section for providing resilient limitation to the swing of the auxiliary ground working frame 65 about the pivot 68.

The draw bar assembly 8 comprises a first draw bar or floating tongue 71 pivotally connected to the first center section 3 and a second draw bar or floating tongue 72 pivotally connected to the second center section 4. First and second clevis groups 74 and 75 are connected to the first and second center sections 3 and 4 and to the first and second floating tongues 71 and 72, respectively. The first and second tongues 71 and 72 pivot about a generally horizontal axis of the clevis groups 74 and 75 to provide additional freedom of movement of the field cultivator frame 1.

The flex link assembly 10 includes a connecting link or bar 80, which extends between the forward ends 23 of the first and second center sections 3 and 4. A first end 81 of the bar 80 has a ball joint 83 through which a nut and bolt 84 extends. The nut and bolt assembly 84 extends through the cross member 19 at the first center section 3 forward end 23.

A second end 87 of the bar 80 has a ball joint 88 therein. A nut and bolt assembly 89 extends through the second end ball joint 88 and through the cross member 19 associated with the forward end 23 of the second center section 4.

As can be seen in FIG. 10, the flex link assembly 10 allows vertical movement of the first and second center sections 3 and 4 relative to one another. The nut and bolt assemblies 84 and 89 include appropriate bushings and washers. The ball joints 83 and 88 also allow a limited degree of front to rear movement of the first and second center sections 3 and 4 relative to each other.

Means, such as the stop plate assembly 14, are provided to limit the vertical deflection of the first and second center sections 3 and 4 through the flex link assembly 10. The stop plate assembly 14 includes a vertically disposed plate 92 which is attached to an extension member 93 of the cross member 19 associated with the forward end 23 of the second center section 4. As illustrated, the extension member 93 is integral with the cross member 19, but it is contemplated that the extension member 93 could be attached thereto, as by welding.

The plate 92 has a slot 95 therein, through which the connecting bar 80 extends. The plate serves to limit the displacement of the first and second center sections 34 relative to one another. FIG. 10 illustrates one extreme position in which the first center section 3 is disposed above the second center section 4. FIG. 6 shows the uppermost and lowermost displacements of the second center section 4. Thus, the stop plate assembly 14 serves to prevent overriding and binding of the first and second center sections 3 and 4.

More limited movement is allowed by the swivel joint assembly 12 than is allowed by the flex link assembly 10, but the swivel joint assembly 12 has been found to be appropriate for the present circumstances, since the amount of angular displacement of the center sections 3 and 4 must be limited in any event. The swivel joint assembly is located at the rearward end 24 of the center sections 3 and 4. An extension member 98 is attached to the first center section 3 and extends into the rearward cross member 19 of the second center section 4, as seen in FIG. 7. An outer end 99 of the extension member 98 defines a socket, which receives a ball 100. A nut and bolt assembly 102 extends vertically through the cross member 19 and the ball 100, providing a vertical axis about which the ball 100 can swing. The socket defined by the extension member outer end 99 permits further rotation of the extension member 98 about a horizontal axis extending longitudinally through the nut and bolt assembly 102. However, movement about the ball 100 is limited by the forward flex link and the spring loaded limit assembly 16.

The spring-loaded limit assembly 16 is included to restrain the first and second sections 14 from buckling along the central axis during transport or tillage due to draw bar pull. The limit assembly 16 is detailed in FIGS. 3 and 4. First and second standards 103 and 104 are attached to and extend upwardly from the first and second center sections 3 and 4. A cross bolt 106 extends between the first and second standards 103 and 104 and includes nuts 107 and 108 for tightening. The cross bolt 106 is connected to the standards 103 and 104 by first and second ball and socket groups 111 and 112, respectively. The ball and socket groups 111 and 112 permit oscillation of the standards 103 and 104 in unison with the first and second center sections 3 and 4.

First and second compression springs 115 and 116 are connected to the cross bolt 106, between the respective first or second standard 103 or 104 and a respective outer end of the cross bolt 106, as seen in FIG. 3. The nuts 107 and 108 retain the springs 115 and 116 in compression, whereby buckling of the center sections 3 and 4 is limited due to the resilient resistance provided by the compression springs 115 and 116.

It is to be understood that while certain forms of the present invention have been illustrated and described herein, it is not to be limited to the specific forms or arrangement of parts described and shown.

What is claimed and desired to be secured by Letters Patent is as follows:

1. A field cultivator frame having a plurality of ground engaging wheels for movable support over the ground; said frame comprising:
   (a) a first center frame section having a plurality of ground working elements; said first center frame section having a forward end and a rearward end;
   (b) a second center frame section pivotally connected to said first center frame section and having a plurality of ground working elements; said second center frame section having a forward end and a rearward end and being connected to said first center frame section along a central axis extending longitudinally of said frame;
   (c) coupling means connected to at least one of said first and second center sections for coupling to a prime mover;
   (d) a flex link assembly extending between and pivotally connected to said first center frame section and said second center frame section; said flex link assembly including a connecting link having a first end pivotally connected to said first center frame section and a second end pivotally connected to said second center frame section;
   (e) said flex link assembly including:
      (1) said connecting link first end having a first ball joint therein;
      (2) a first nut and bolt assembly extending through said first ball joint and connecting said connecting link first end to said first center frame section;
      (3) said connecting link second end having a second ball joint; and
      (4) a second nut and bolt assembly extending through said second ball joint and connecting said connecting link second end to said second center frame section;
   (f) a frame extension member extending from one of said first and second center frame sections near said connecting link; and
   (g) a plate attached to said frame extension member, said plate having a slot therein through which said connecting link extends for limiting vertical displacement of said connecting link and said first and second center frame sections relative to one another.

2. A field cultivator frame having a plurality of ground engaging wheels for movable support over the ground; said frame comprising:
   (a) a first center frame section having a plurality of ground working elements; said first center frame section having a forward end and a rearward end;
   (b) a second center frame section pivotally connected to said first center frame section and having a plurality of ground working elements; said second center frame section having a forward end and a rearward end and being connected to said first center frame section along a central axis extending longitudinally of said frame;
   (c) coupling means connected to at least one of said first and second center sections for coupling to a prime mover;
   (d) a flex link assembly extending between and pivotally connected to said first center frame section and said second center frame section; said flex link assembly including a connecting link having a first end pivotally connected to said first center frame section and a second end pivotally connected to said second center frame section; and
   (e) a spring-loaded limit assembly including:
      (1) first and second standards attached to and extending upwardly from said first and second center sections, respectively;
      (2) a cross bolt extending between upper ends of said first and second standards;
      (3) a first ball and socket group pivotally connected to said first standard upper end, said cross bolt extending through said first ball and socket group;
      (4) a second ball and socket group pivotally connected to said second standard upper end, said cross bolt further extending through said second ball and socket group;
      (5) a first compression spring connected to and surrounding said cross bolt between said first standard upper end and a first outer end of said cross bolt;
      (6) means for retaining said first compression spring on said cross bolt;
      (7) a second compression spring connected to and surrounding said cross bolt between said second standard upper end and a second outer end of said cross bolt; and
      (8) means for retaining said second compression spring on said cross bolt.

3. A field cultivator frame comprising:
   (a) a first center frame section having a plurality of depending ground working elements; said first center frame section having a forward end and a rearward end and being supported by a ground engaging wheel assembly;

(b) a second center frame section pivotally connected to said first center frame section and having a plurality of ground working elements depending therefrom; said second center frame section having a forward end and a rearward end and being supported by a ground engaging wheel assembly; said first and second center frame sections being connected along a central axis extending generally longitudinally of said frame;

(c) coupling means connected to at least one of said first and second center sections for coupling to a prime mover;

(d) a flex link assembly extending between and pivotally connected to said forward end of said first center frame section and said forward end of said second center frame section; said flex link assembly including:
 (1) a connecting bar having a first end pivotally connected to said first center frame section and a second end pivotally connected to said second center frame section;
 (2) a first ball joint in said connecting bar first end;
 (3) a second ball joint in said connecting bar second end; and
 (4) first and second nut and bolt assemblies extending through said first and second ball joints, respectively, and connecting said connecting bar first and second ends to said first and second center frame section, respectively;

(e) a swivel joint assembly connecting said rearward end of said first center frame section to said rearward end of said second center frame section; said swivel joint assembly including:
 (1) an extension member extending from said first center frame section toward said second center frame section;
 (2) a ball pivotally received in a socket defined in an outer end of said extension member and positioned within a portion of said second center frame section; and
 (3) a third nut and bolt assembly extending vertically through said ball and said second center frame section, whereby oscillating motion about said third nut and bolt assembly and said ball is permitted;

(f) a frame extension member extending from one of said first and second center frame sections near said connecting bar; and (g) a plate attached to said frame extension member, said plate having a slot therein through which said connecting bar extends for limiting vertical displacement of said first and second center frame sections relative to one another.

4. The field cultivator frame as set forth in claim 3 wherein said coupling means include first and second draw bars hingedly connected to said first and second center frame sections, respectively, for vertical movement about a horizontal axis.

5. The field cultivator frame as set forth in claim 3 including:
(a) a first wing frame section hingedly connected to said first center frame section and extending laterally thereof;
(b) a second wing frame section hingedly connected to said second center frame section and extending laterally thereof;
(c) said first section ground wheel assembly and said second section ground wheel assembly comprising first and second front wheel assemblies connected to said first and second center frame sections, respectively, and extending generally forwardly of respective said forward ends thereof; and a central wheel assembly connected to one of said first and second center frame sections and positioned generally along said central axis near said rearward ends of said first and second center frame sections;
(d) a first wing wheel assembly connected to one of said first center frame section and first wing frame section and positioned generally along a longitudinal axis extending between the hinged connection between said first center frame section and said first wing frame section;
(e) a second wing wheel assembly connected to one of said second center frame section and said second wing frame section and extending generally along a longitudinal axis of said hinged connection between said second center frame section and said second wing frame section; and
(f) first and second outer wheel assemblies connected to respective outer ends of said first and second wing frame sections and extending laterally thereof; said first and second outer wheel assemblies being positioned generally forward of a transverse central axis of said field cultivator frame.

6. A field cultivator frame comprising:
(a) a first center frame section having a forward end and a rearward end;
(b) a second center frame section pivotally connected to said first center frame section along a central axis extending longitudinally of said frame and having a forward end and a rearward end;
(c) ground engaging wheels positioned on the center frame sections to movably support same over a ground surface;
(d) tongue means connected to at least one of said first and second center sections for coupling to a prime mover;
(e) a flex link assembly extending between and pivotally connected to said first center frame section and said second center frame section; said flex link assembly including a connecting link positioned externally of said first center frame section and said second center frame section, said link having a first end pivotally connected to said first center frame section externally of said first section and a second end pivotally connected to said second center frame section externally of said second section; and
(f) flex link limiting means positioned on one of said first and second center frame sections and extending vertically therefrom, said flex link limiting means positioned intermediate said first end and said connecting link extending through said limiting means, said limiting means alternately engageable with said connecting link in two spaced vertical positions of said link to limit vertical displacement of said connecting link and said first and second center frame sections relative to one another.

7. The field cultivator frame as set forth in claim 6 wherein said flex link assembly includes:
(a) said connecting link first end having a first ball joint therein;
(b) a first nut and bolt assembly extending through said first ball joint and connecting said connecting link first end to said first center frame section;
(c) said connecting link second end having a second ball joint; and (d) a second nut and bolt assembly extending through said second ball joint and connecting said connecting link second end to said second center frame section.

8. The field cultivator frame set forth in claim 7 wherein:
   (a) said flex link assembly connects one end of said first center frame section to one end of said second center frame section; and
   (b) a swivel joint assembly connects another end of said first center frame section to another end of said second center frame section; and said swivel joint assembly includes an extension member connecting said first and second center frame sections, a ball pivotally received in an outer end of said extension member, and a nut and bolt assembly extending vertically through said ball and one of said first and second center frame sections, whereby oscillating motion about said nut and bolt assembly and said ball is permitted.

9. The field cultivator frame as set forth in claim 6 wherein:
   (a) said coupling means includes a first raw bar hingedly connected to said first center frame section for vertical movement about a horizontal axis; and
   (b) said coupling means includes a second draw bar hingedly connected to said second center frame section for vertical movement about a horizontal axis.

10. The field cultivator frame as set forth in claim 6 wherein said ground engaging wheels include
    (a) first and second front wheel assemblies pivotally connected to said first and second center frame sections, respectively, and extending generally forwardly thereof;
    (b) a central wheel assembly pivotally connected to one of said first and second center frame sections and positioned along said central axis in a hinge pocket defined between said first and second center sections;
    (c) a first wing wheel assembly pivotally connected to said first center frame section and extending laterally thereof; and
    (d) a second wing wheel assembly pivotally connected to said second center frame section and extending laterally thereof.

11. The field cultivator frame as set forth in claim 10 including:
    (a) a first wing section hingedly connected to said first center section, said first wing section and said first center section defining a wing hinge pocket therebetween with said first wing wheel assembly disposed therein;
    (b) a first outer wheel assembly pivotally connected to said first wing section and extending laterally thereof;
    (c) a second wing section pivotally connected to said second center section; said second wing section and said second center section defining a wing hinge pocket therebetween, with said second wing wheel assembly disposed therein;
    (d) a second outer wheel assembly pivotally connected to said second wing section and extending laterally thereof;
    (e) motive means for pivoting said first and second wing sections upwardly out of ground contact for transporting said field cultivator frame.

12. The field cultivator frame as set forth in claim 11 wherein said first and second center sections and said first and second wing sections each have diagonally extending reinforcing members defining two interlocking triangular arrangements in each of said sections.

13. A field cultivator frame as set forth in claim 6 wherein said flex link limiting means includes:
    (a) a flex link limiting plate attached to one of said first and second center frame sections, said plate having a slot therein through which said connecting link extends for limiting vertical displacement of said connecting link and said first and second center frame sections relative to one another by engagement of said connecting link with said plate.

14. A field cultivator frame as set forth in claim 6 wherein said flex link limiting means includes:
    (a) a frame extension member extending from one of said first and second center frame sections near said connecting link; and
    (b) a flex link limiting plate attached to said frame extension member, said plate having a slot therein through which said connecting link extends to limit vertical displacement of said connecting link and said first and second center frame sections relative to one another by engagement of said connecting link with said plate.

15. A field cultivator frame as set forth in claim 6 wherein:
    (a) said connecting link is pivotally connected between said forward ends of said first and second center frame sections to allow vertical deflections of said forward ends relative to one another; and
    (b) pivot means is connected between said rearward ends of said first and second center frame sections to accommodate said vertical deflections of said forward ends.

* * * * *